INVENTOR.
Henry T. Moore.
BY

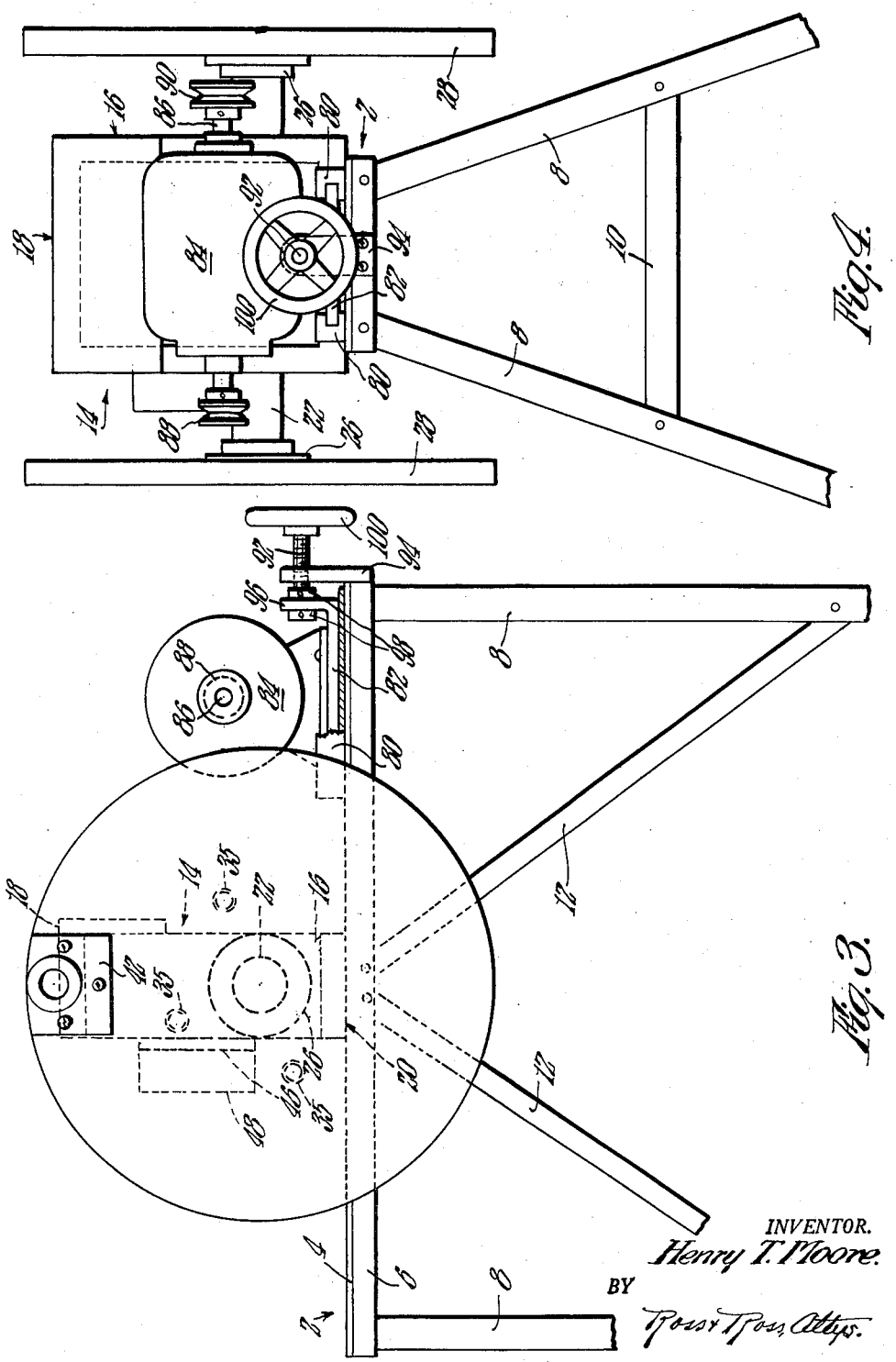

United States Patent Office 2,930,418
Patented Mar. 29, 1960

2,930,418

WORK TABLE WITH SELECTIVE ROTATING TOOL

Henry T. Moore, Greenfield, Mass.

Application September 11, 1958, Serial No. 760,471

4 Claims. (Cl. 144—1)

This invention relates to improvements in apparatus for supporting, selectively positioning and driving power driven tools.

The principal objects of the invention are directed to the provision of apparatus which is arranged for supporting a plurality of various power driven tools and is adapted to selectively position a selected tool carried thereby in an operative position for connecting said tool to a power means of the apparatus.

The apparatus is adapted for general use in connection with power driven tools but is particularly adapted for the home workshop, where it may be desired to operate a planer, jointer, circular saw or the like.

The apparatus of the invention is compact to occupy small space, and is strong and rugged so that tools associated therewith are supported without objectionable vibration and noise.

Various changes and modifications may be made in the form of the apparatus to adapt it for use with various tools without departing from the spirit and scope of the invention.

In the drawings:

Fig. 3 is a side elevational view of the apparatus shown in Fig. 1, with the saw and table omitted; and Fig. 4 is a rear end elevational view of the apparatus shown in Fig. 1, with the saw and table omitted.

Figures 1, 2:
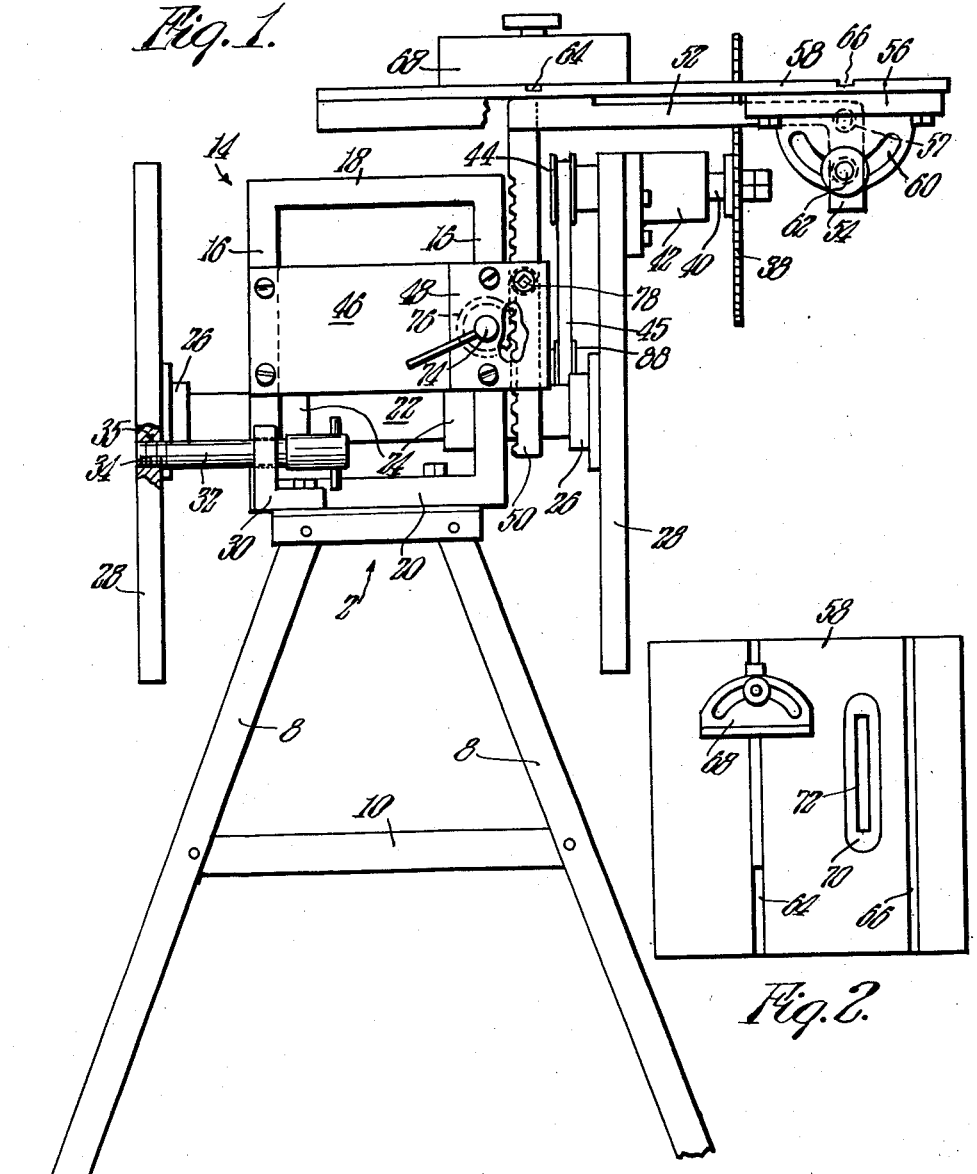
Fig. 1 is a front end elevational view of the apparatus of the invention for supporting, selectively positioning, and operating power driven tools.
Fig. 2 is a plan view of the table of the apparatus shown in Fig. 1.

Referring now to the drawings more in detail, the novel features of the invention will be fully described.

An elongated horizontal bed 2 is provided which may be formed by a plate 4 secured in some suitable manner to a frame 6 therebelow. Said frame may be formed by angle iron or the like.

Legs 8 have upper ends secured to the bed 2 at opposite ends thereof by screws or rivets or by welding. Said legs depend from the bed in diverging relation for supporting the bed. End braces 10 have opposite ends secured to said legs 8, by rivets, or they may be welded to the legs.

Elongated side braces 12 have upper ends secured to opposite sides of the bed and extend outwardly in diverging relation to the end legs 8 to which they are secured.

A frame member 14, which is box like in form, has side walls 16, an upper wall 18, and a lower wall 20. The frame is strong and rigid and has its lower wall 20 secured to the upper side of the bed 2, as by bolts or the like.

A shaft 22 is horizontally journalled in the side walls 16 of the frame 14, and is held against axial movement by collars 24 secured thereto. Flange devices 26 fixed to outer ends of the shaft 22 have tool carriers 28 secured to outer sides thereof. Said carriers are preferably disc like in form, but may take any desired form.

Various power tools which are to be driven may be secured to the carriers. Such tools may be a planer, jointer, circular saw, or the like.

Tools secured to the carriers may be placed in a selected operating position by turning the carriers. A selected position would ordinarily be at the upper side of the carriers, where it may be connected to a power means.

The carriers 28 are locked in the selected operating position of a particular tool by the following means. A bracket 30 is secured to one side of the bed 2 and a lock member 32 is rotatable and reciprocable therein. The member 30 is provided with an outer threaded end 34. The carrier 28, at the left in Fig. 1, is provided with a plurality of tapped holes, such as 35, for receiving the threaded end 34 of the lock 32. Such tapped holes are positioned around the carrier so that it is releasably locked to position various tools carried thereby in selected operating positions.

For illustrative purposes, one form of power tool is shown carried by the carrier 28, at the right in Fig. 1. Such is a saw which is fixed on a shaft 40, rotatable in a bearing 42 secured to the face of said carrier. A pulley 44 is secured on the shaft 40 for a belt connection to a power source, as will be described.

A plate 46 and a bracket 48 are fixed to the frame 14 by suitable means, and a rack 50 is slidable up and down in said bracket. A lateral arm 52 is integral with the upper end of the rack, and has a depending leg 54. A bracket 56 is fixed on the underside of a table and has an arcuate slot 60. The bracket 56 is pivoted at 57 to the arm 52. A clamp screw 62 extends through said slot 60 and is in threaded engagement with the leg 54. By loosening the screw 62, the table may be tilted on the pivot 67, and then by tightening the screw, the table may be secured in a tilted relation.

The table 58 is provided with elongated guideways 64 and 66, and the usual miter gage 68 which is slidable in one of the guideways, in the well known manner. A plate 70 is provided in the table which is formed with a slot 72 for a saw blade, such as 38.

A shaft 74 is rotatable in the bracket 48, and has a pinion or gear 76 fixed thereon, and which is in operative engagement with the rack 50 for raising and lowering the table 58. A clamp screw 78, in threaded engagement with the bracket 48, is adapted to bear on the rack 50 and hold it against movement. By turning the shaft 74 in one direction or the other, the table may be raised and lowered.

Means for driving a tool of a carrier in its selected operation position will now be described.

Guideways 80 are transversely spaced apart, are fixed to an end of the bed 2, and extend longitudinally thereof. A slide 82 is reciprocable back and forth therein, and an electric drive motor 84 is fixed to said slide.

A shaft 86 of the motor is rotatable on a horizontal axis. Said shaft has on its opposite ends drive pulleys 88 and 90 fixed thereto. Either of said drive pulleys may be belt connected to a pulley of a tool carried by a carrier. The pulley 44 of the circular saw is shown in Fig. 1 as being connected by a belt 45 to the pulley 88.

An adjusting screw 92 is in threaded engagement with a plate 94 secured to the end of the bed 2. An end of the screw 92 is rotatable in an ear 96 of the slide 82, and is held against axial movement relative to said ear, by collars 98, secured thereto.

A hand wheel 100 is fixed on the outer end of the screw 92 for turning said screw. The slide 82 may be moved back and forth to adjust the tension of a belt engaging one of the motor pulleys and the pulley of a tool carried by a carrier.

From the foregoing it will be observed that the apparatus embodies a rigid bed which is supported by a system of interconnected legs.

A pair of carriers are simultaneously turnable in a frame of the bed so that a tool carried by a carrier may be positioned in a selected position for operation by the drive means. Such power driven tools as are carried by the carriers will be provided with driven pulleys for connection with a pulley of the power source.

The apparatus is adapted for various power driven tool devices. The motor is adjustable in order to obtain the desired tension of the belt connecting a pulley of the drive motor with the pulley of a tool.

The carriers are releasably locked to position various tools carried thereby in selected operative positions, by means of the lock member which is threadedly engageable with tapped holes of a carrier.

Various changes and modifications may be made in the form of the apparatus within the spirit and scope of the invention and it is desired to be limited, if at all, by the following claims rather than by the foregoing description.

It is desired to claim and secure by Letters Patent of the United States:

1. Apparatus for supporting and selectively positioning and driving power driven tools comprising, an elongated horizontal bed, a system of interconnected supporting legs secured to and depending from said bed, a frame secured to said bed and extending upwardly therefrom, a main shaft rotatable on a horizontal axis in said frame, a pair of tool carriers at opposite sides of said bed and rigid connections between said carriers and opposite ends of said main shaft whereby said carriers are rotatable on and with said main shaft, said carriers adapted for securement thereto for relative rotation of power driven tools having tool arbor shafts provided with driven pulleys, means for releasably locking said carriers in a selected rotated position of a tool carried thereby, a motor carried on a slide adjustably movable back and forth in guideways provided at one end of said bed and extending longitudinally of said bed, means for moving said slide, said motor having a drive shaft provided with opposite ends, and pulleys fixed on the opposite ends of said shaft for selective belt connection to said driven pulleys of tools on the tool arbor shafts carried by said carriers.

2. Apparatus set forth in claim 1 wherein said means for releasably locking said carriers in selected position of a tool carried by a carrier includes, a bracket secured to said bed adjacent one carrier, and a lock member rotatable and reciprocable therein having a threaded outer end engageable in a tapped hole provided in said one carrier.

3. Apparatus for supporting and selectively positioning and driving power driven tools comprising, an elongated horizontal bed, a system of interconnected supporting legs secured to said bed and depending therefrom, a frame secured to said bed and extending upwardly therefrom, a main shaft rotatable on a horizontal axis in said frame having opposite ends, carriers for securement thereto of power driven tools fixedly secured to said opposite ends of the main shaft, a rack mounted relative to said frame for vertical up and down adjustment, means to adjust said rack up and down and means to releasably hold said rack in its vertically adjusted position, a power driven tool having a tool arbor shaft rotatable in one said carrier having a circular saw and a driven pulley, means acting on one said carrier to lock said carriers in a selected operating position of said tool, a table pivotally connected to said rack for adjustable tilting movements on an axis transverse to the axis of said shaft and having a slot to receive said saw, means to releasably lock said table in adjusted position, and tool driving means rotating said driven pulley.

4. Apparatus set forth in claim 3 wherein said tool driving means includes a motor adjustable longitudinally of said bed having a shaft provided with a drive pulley belt connected to said driven pulley.

References Cited in the file of this patent

UNITED STATES PATENTS

| | | |
|---|---|---|
| 468,882 | Luther | Feb. 16, 1892 |
| 720,912 | Gorton | Feb. 17, 1903 |
| 1,519,378 | Johnson et al. | Dec. 16, 1924 |
| 1,528,188 | Frost | Mar. 3, 1925 |
| 1,778,967 | Tessmer | Oct. 21, 1930 |
| 2,319,025 | Wehringer | May 11, 1943 |
| 2,747,626 | Goldschmidt | May 29, 1956 |
| 2,785,711 | Webb | Mar. 19, 1957 |